(12) United States Patent
Nagayasu et al.

(10) Patent No.: US 6,513,878 B2
(45) Date of Patent: Feb. 4, 2003

(54) ATTACHMENT STRUCTURE OF FUNCTIONAL MEMBER

(75) Inventors: Hidetaka Nagayasu, Toyota (JP); Masayuki Kato, Toyota (JP); Hitoshi Yanase, Toyota (JP)

(73) Assignee: Araco Kabushiki Kaisha, Toyota (JP)

( * ) Notice: Subject to any disclaimer, the term of this patent is extended or adjusted under 35 U.S.C. 154(b) by 0 days.

(21) Appl. No.: 09/742,061

(22) Filed: Dec. 22, 2000

(65) Prior Publication Data

US 2001/0006302 A1 Jul. 5, 2001

(30) Foreign Application Priority Data

Dec. 27, 1999 (JP) .......................................... 11-370628

(51) Int. Cl.⁷ ................................................. A47C 7/16
(52) U.S. Cl. ................................................. 297/452.18
(58) Field of Search ..................................... 297/452.18

(56) References Cited

U.S. PATENT DOCUMENTS

| | | | | |
|---|---|---|---|---|
| 5,328,248 A | * | 7/1994 | Nishiyama | 297/452.18 X |
| 5,897,168 A | * | 4/1999 | Bartelt et al. | 297/452.18 |
| 5,918,943 A | * | 7/1999 | Mitshelen et al. | 297/452.18 |
| 6,027,171 A | * | 2/2000 | Partington et al. | 297/452.18 |
| 6,048,033 A | * | 4/2000 | Sakurai et al. | 297/452.18 |
| 6,375,267 B1 | * | 4/2002 | Ishikawa | 297/452.18 |
| 6,378,946 B1 | * | 4/2002 | Cope et al. | 297/452.18 X |

FOREIGN PATENT DOCUMENTS

| | | |
|---|---|---|
| EP | 0 881 116 A2 | 12/1997 |
| JP | 05-23232 | 2/1993 |
| JP | 05-70343 | 9/1993 |
| JP | 05-70344 | 9/1993 |
| JP | 05-70345 | 9/1993 |
| JP | 07-005454 | 1/1995 |
| JP | 09-240341 | 9/1997 |
| JP | 2001-514027 | 8/1998 |
| JP | 10-309968 | 11/1998 |
| JP | 10-323256 | 12/1998 |
| JP | 11-348628 | 12/1999 |

* cited by examiner

Primary Examiner—Rodney B. White
(74) Attorney, Agent, or Firm—Oliff & Berridge, PLC

(57) ABSTRACT

A structure allows a functional member to be attached to an alloy frame without welding. In the state where a ratchet is disposed on a second side of the frame having an attachment bracket supported on a first side, a first fastener member is inserted through the functional member, frame, and attachment bracket so as to be received by a second fastener member provided in the attachment bracket.

22 Claims, 5 Drawing Sheets

ATTACHMENT STRUCTURE OF FUNCTIONAL MEMBER

The disclosure of Japanese Patent Application No. 11-370628, filed on Dec. 27, 1999, including the specification, drawings and abstract, is incorporated herein by reference in its entirety.

BACKGROUND OF THE INVENTION

1. Field of the Invention

The invention relates to an attachment structure for attaching a functional member to a frame body.

2. Description of Related Art

A functional member is generally attached to a frame body by welding the functional member directly to the frame body, or by attaching the functional member to an attachment bracket welded to the frame body by means of, for example, a bolt.

In recent years, various structural components have been reduced in weight by integrally molding a frame body constituting a structural component from an alloy as a molding material, for example, magnesium alloy and aluminum alloy. The structural component is formed by attaching various functional members to the frame body. However, the functional member exhibits high strength and rigidity, and is formed from a metal material different from that of the frame body. Therefore, it is difficult to weld the functional members directly to the frame body. It is likewise difficult to weld an attachment bracket to the frame body for attaching the functional member.

SUMMARY OF THE INVENTION

It is an object of the invention to provide an attachment structure that allows easy attachment of various functional members to a frame body formed of an alloy that would be difficult to attach through welding.

In order to achieve the foregoing object, the attachment structure of a functional member according to various exemplary embodiments of the invention is provided with a frame integrally molded from an alloy and a functional member supported on a first side of the frame. In this structure, a first fastener member is inserted through the functional member and the frame body on which the functional member is disposed. An attachment bracket is provided on a second side of the frame, which is different from the first side. Further, a second fastener member is provided in the bracket. The first fastener member is received into the second fastener member.

Accordingly, functional members formed from various materials can be easily attached to the alloy frame body.

BRIEF DESCRIPTION OF THE DRAWINGS

Various exemplary embodiments of the invention will be described with reference to the accompanying drawings, in which like numerals are used to represent like elements and wherein.

DETAILED DESCRIPTION OF EXEMPLARY EMBODIMENTS

Figure 1:
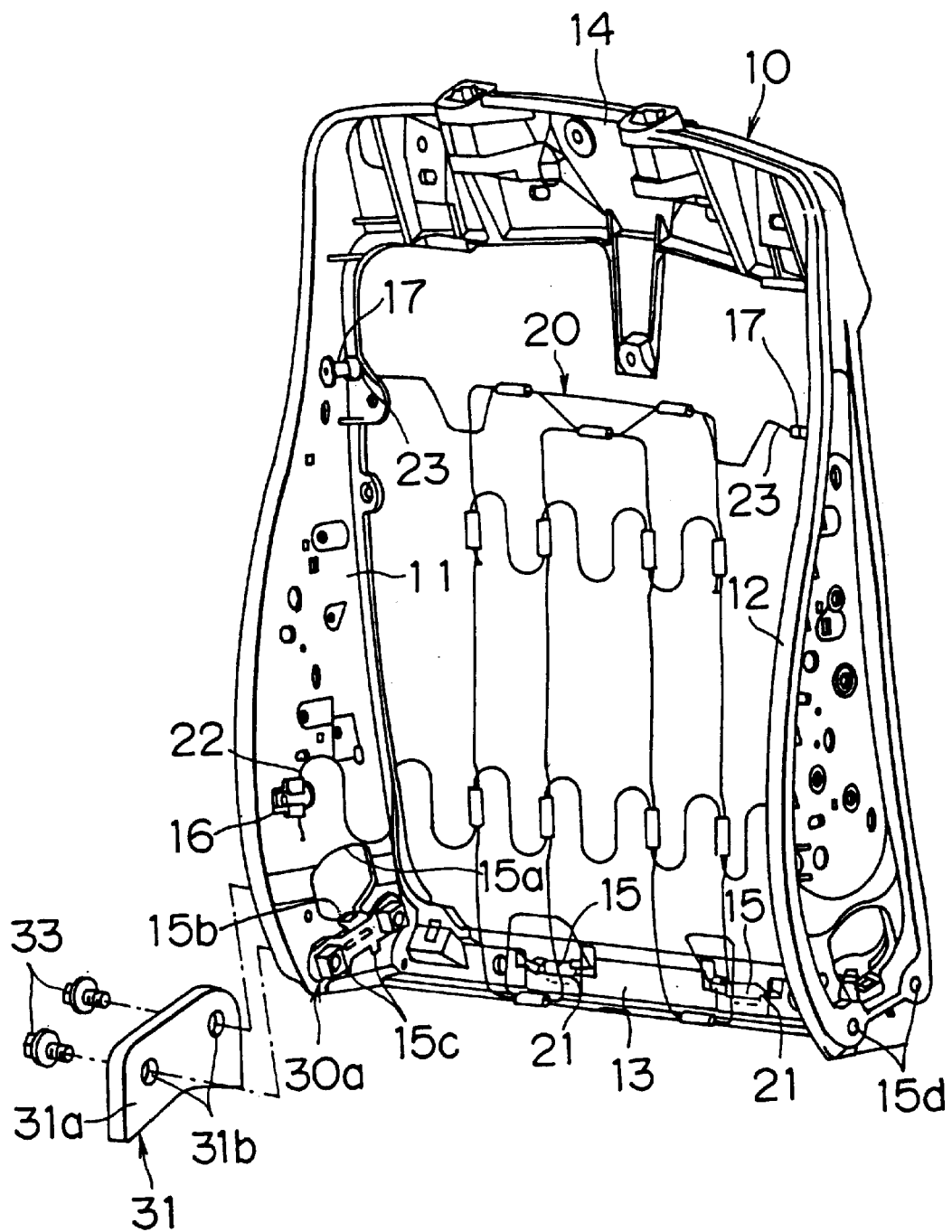
FIG. 1 is a perspective view of a seat back frame as a structural component to which the invention is applied.
Figure 2:
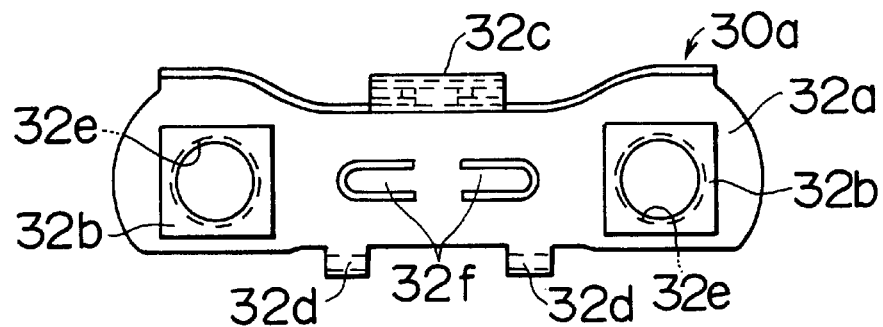
FIG. 2 is a front view of a first exemplary embodiment of an attachment bracket according to the invention.
Figure 3:
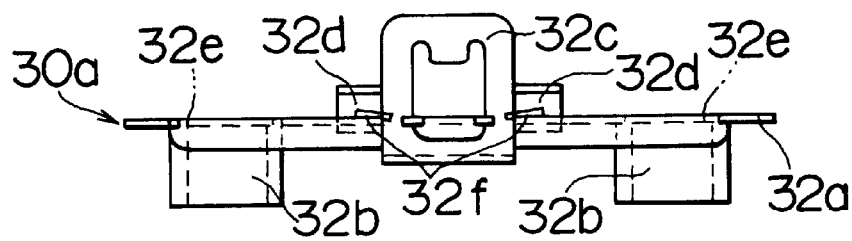
FIG. 3 is a plan view of the attachment bracket shown in FIG. 2.
Figure 4:
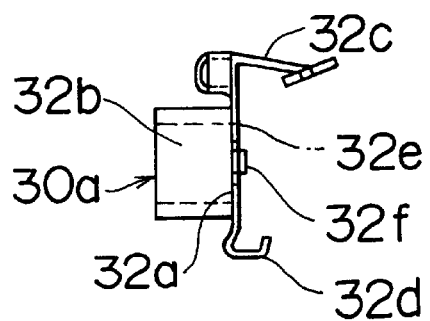
FIG. 4 is a side view of the attachment bracket shown in FIG. 2.

Hereinafter, various exemplary embodiments of the invention will be described referring to the drawings.

FIG. 1 shows an example of a structural component according to the invention. This structural component is a seat back frame forming a vehicle seat, and is composed of a frame 10 as a frame body, and a spring unit 20. The frame 10 is formed by integrally molding a highly ductile light alloy as a molding material, for example, magnesium alloy and aluminum alloy, using a metal mold casting method. Included as the metal mold casting method are a thixomolding method for injection-molding a semi-molten light alloy as the molding material, and a die casting method.

The frame 10 has an opening in the center, and includes as main components a pair of left and right side frame portions 11 and 12, respectively, a lower frame portion 13 connecting the respective lower portions of the side frame portions 11, 12 to each other, and an upper frame portion 14 connecting the respective upper portions of the side frame portions 11, 12. The spring unit 20 is attached to the frame 10 at the side frame portions 11, 12 and the lower frame portion 13.

The spring unit 20 has a rectangular shape, and is formed by connecting a plurality of wire springs with each other at each intersection. The spring unit 20 is provided with first hooked portions 21 in the intermediate portion of its lower side, second hooked portions 22 at its lower right and left ends, and third hooked portions 23 at its upper right and left ends. The spring unit 20 is attached to the frame 10 by hooking the first hooked portions 21 to respective hook portions 15 provided in the intermediate portion of the lower frame portion 13 of the frame 10, hooking the second hooked portions 22 to respective hook brackets 16 provided in the side frame portions 11, 12, and hooking the third hooked portions 23 to respective hook brackets 17 provided in the side frame portions 11, 12.

In this seat back frame, a ratchet 31 is attached to each lower end of the side frame portions 11, 12 by means of a first exemplary attachment bracket 30a. The ratchet 31 is a functional member that constitutes a functional part, for example, a reclining mechanism. The ratchet 31 is formed from a steel exhibiting high strength and hardness, and serves for connection to a seat cushion frame together with upper and lower hinge plates.

As shown in FIGS. 1 to 4, the attachment bracket 30a of this embodiment is formed of a bracket body 32a, and a pair of right and left fastener members, for example, nuts 32b, fixed to the front surface of the bracket body 32a. The bracket body 32a is provided with a hooked portion 32c in the center of its upper edge and a pair of right and left pawls 32d in the center of its lower edge. The bracket body 32a is further provided with a pair of right and left U-shaped notched spring pieces 32f in the center. These spring pieces 32f slightly project from the rear surface of the bracket body 32a.

The nuts 32b are located so as to face respective through holes 32e formed in the bracket body 32a, and are also located such that the nuts 32b can face respective through holes 15d formed downward of an attachment hole 15a (i.e., an attachment portion) of the side frame portions 11, 12. The hooked portion 32c is a flexible snapping portion that is bent backward so as to be slightly inclined downward. The hooked portion 32c can be hooked in a snapping manner at a hooking groove 15b formed at the lower end of the attachment hole 15a of the side frame portions 11, 12. The pawls 32d are snapping, flexible pawls having an upward-opening U-shape. The pawls 32d are respectively inserted into holes 15c formed under the attachment hole 15a of the side frame portions 11, 12, such that the pawls 32d are hooked at the upper edges of the holes 15c.

The attachment bracket 30a is attached to the inner side of the side frame portions 11, 12 by hooking the hooked portion 32c in a snapping manner at the hooking groove 15b formed at the lower end of the attachment hole 15a of the side frame portions 11, 12. Moreover, the attachment bracket 30a is positioned and retained with respect to the through holes 15d formed in the side frame portions 11, 12 by hooking the pawls 32d at the upper edges of the holes 15c. When the attachment bracket 30a is in an attached state, the spring pieces 32f are pressed between the rear surface of the bracket body 32a and the side frame portions 11, 12 so as to absorb "looseness" between the rear surface of the bracket body 32a and the side frame portions 11, 12.

Thus, as shown in FIG. 1, the attachment bracket 30a is attached to the inner side of the side frame portions 11, 12, and the ratchet 31 is attached to the outer side of the side frame portions 11, 12 by means of the attachment bracket 30a. Fastener members, for example attachment bolts 33, are respectively inserted into through holes 31b formed in the upper end of a ratchet body 31a, the through holes 15d of the side frame portions 11, 12, and the through holes 32e of the attachment bracket 30a such that the attachment bolts 33 are respectively screwed into the nuts 32b. Thus, with the attachment bolts 33, the ratchet 31 is attached to the side frame portions 11, 12 by means of the attachment bracket 30a.

Thus, the attachment structure of the invention allows attachment of the ratchet 31 to the outer side of the side frame portions 11, 12 by simply screwing the attachment bolts 33 into the respective nuts 32b of the attachment bracket 30a. As a result, attachment of the ratchet 31 is facilitated as compared with the case of light-alloy frame for which it is difficult to use welding.

Figure 5:
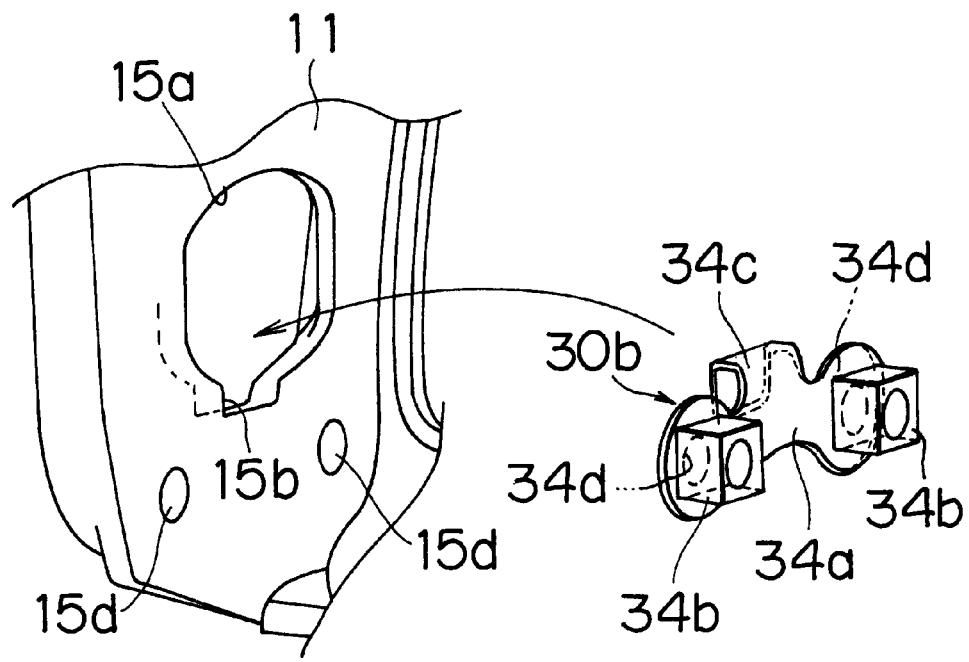
FIG. 5 is a perspective view of a second exemplary embodiment of an attachment bracket according to the invention.

FIG. 5 shows a second exemplary embodiment of the invention. Note that, in the following embodiments, a seat back frame 10 to which the second exemplary attachment bracket is attached is the same as that of the first exemplary embodiment shown in FIG. 1. Like elements are denoted with like reference numerals, and specific description thereof, thus, will be omitted. In this exemplary embodiment, an attachment bracket 30b is composed of a bracket body 34a and a pair of right and left nuts 34b fixed to the front surface of the bracket body 34a. The bracket body 34a has a hooked portion 34c in the center of its upper edge. The nuts 34b are located so as to face the respective through holes 34d formed in the bracket body 34a, and are also located such that the nuts 34b can face the respective through holes 15d formed downward of the attachment hole 15a, i.e., an attachment portion, of the side frame portions 11, 12. The hooked portion 34c is a U-shaped flexible snapping portion with a predetermined width, which opens downward, and is formed to be hooked at the edge of the hooking groove 15b of the attachment hole 15a in the side frame portions 11, 12.

The attachment bracket 30b of the second exemplary embodiment is similar to the attachment bracket 30a of the first exemplary embodiment except that the attachment bracket 30b is not provided with the pawls 32d. Regarding attachment of the ratchet 31, the attachment bracket 30b functions similar to the attachment bracket 30a.

Figure 6:
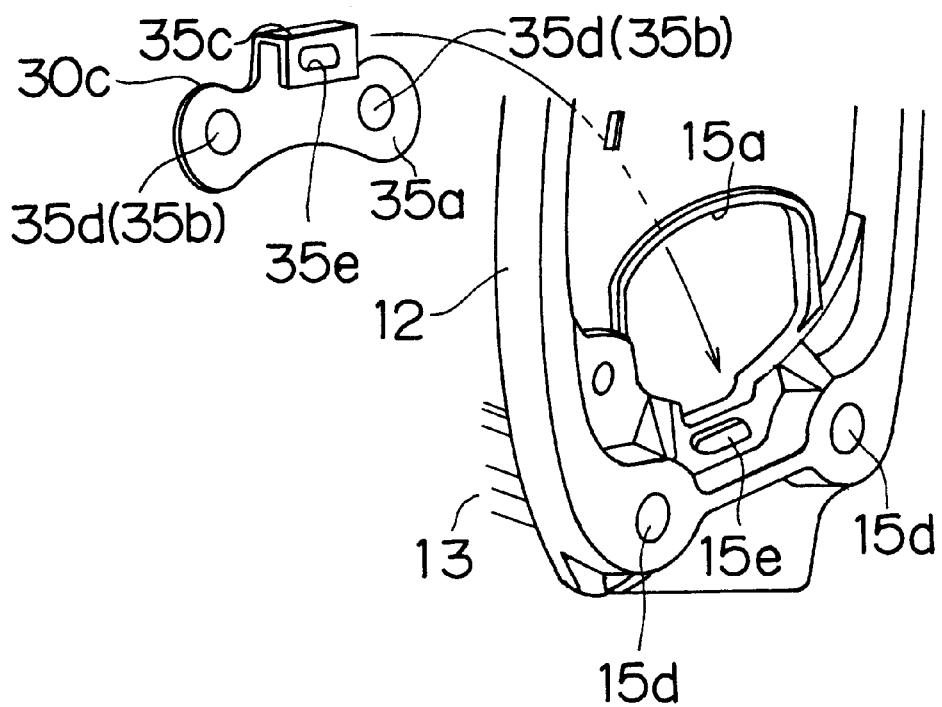
FIG. 6 is a perspective view of the back of a third exemplary embodiment of an attachment bracket according to the invention.

FIG. 6 shows a third exemplary embodiment of the invention. An attachment bracket 30c of this exemplary embodiment is similar to the attachment bracket 30b of the second exemplary embodiment, and is provided with a bracket body 35a and a pair of right and left nuts 35b fixed to the front surface of the bracket body 35a. The bracket body 35a has a hooked portion 35c in the center of its upper edge. The nuts 35b are located so as to face the respective through holes 35d formed in the bracket body 35a.

The attachment bracket 30c has a hole 35e formed in the rear wall of the hooked portion 35c. The retained hole 35e is engaged with a projection 15e formed on the outer side of the side frame portions 11, 12. In the state where the hole 35e is engaged with the retaining projection 15e, the attachment bracket 30c is positioned and retained with respect to the through holes 15d of the side frame portion 11, 12. Thus, the attachment bracket 30c of the third exemplary embodiment has a positioning and retaining function by means of the hole 35e and the projection 15e in addition to the functions of the attachment bracket 30b of the second exemplary embodiment.

Figure 7:
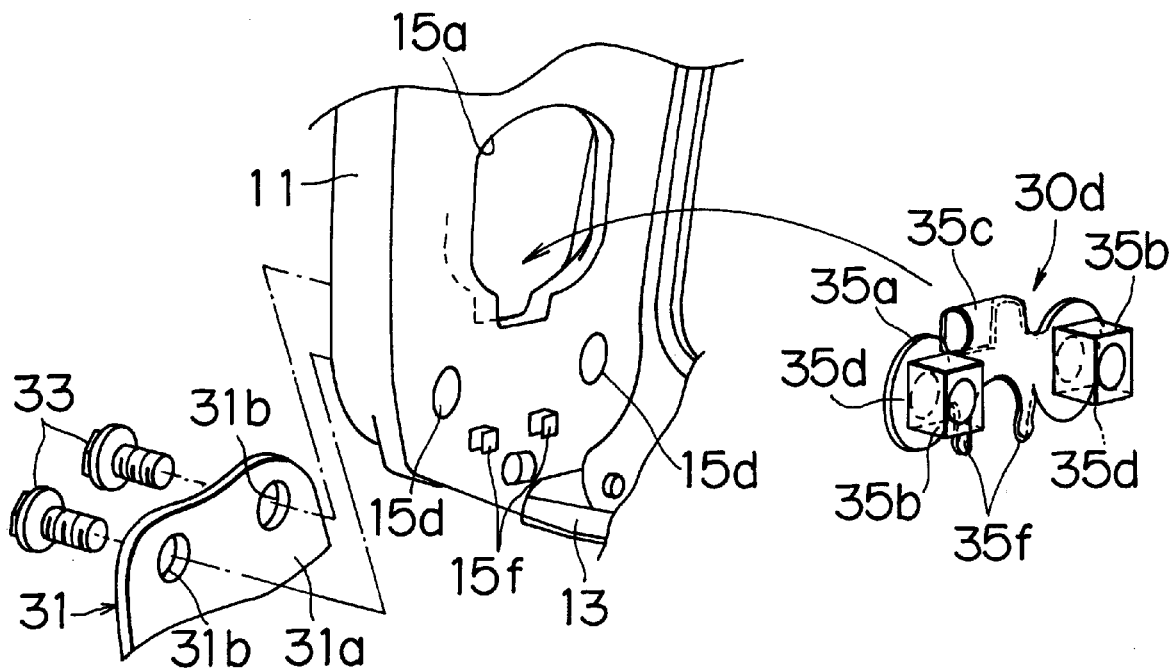
FIG. 7 is a perspective view of a fourth exemplary embodiment of an attachment bracket according to the invention.

FIG. 7 shows a fourth exemplary embodiment of the invention. An attachment bracket 30d of this embodiment is similar to the attachment bracket 30b of the second exemplary embodiment, and is different from the attachment bracket 30c of the third exemplary embodiment in that the hole 35e is replaced with a pair of legs 35f. In the attachment bracket 30d, the retained legs 35f are hooked at respective pawls 15f provided on the inner side of the side frame portions 11, 12. In the state where the legs 35f are hooked at the pawls 15f, the attachment bracket 30d is positioned and retained with respect to the through holes 15d of the side frame portions 11, 12. Thus, the attachment bracket 30d of the fourth exemplary embodiment functions similarly to the attachment bracket 30c of the third exemplary embodiment.

Figure 8:
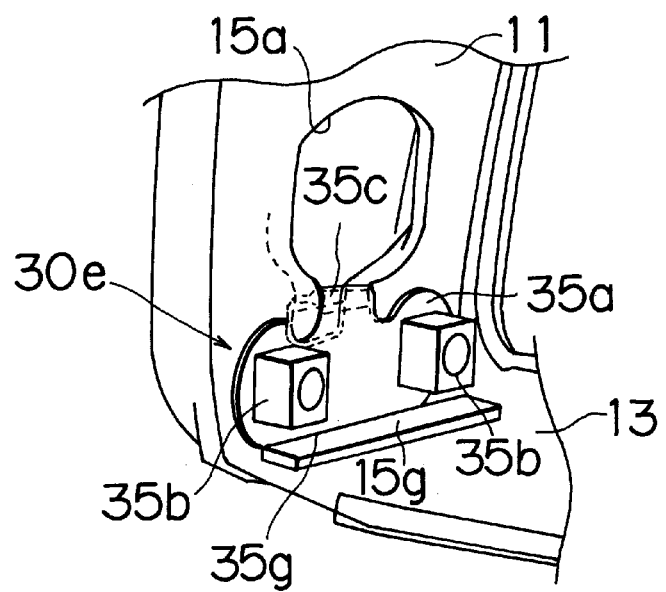
FIG. 8 is a perspective view of a fifth exemplary embodiment of an attachment bracket according to the invention.

FIG. 8 shows a fifth exemplary embodiment of the invention. An attachment bracket 30e of this embodiment is similar to the attachment bracket 30b of the second exemplary embodiment, and is different from the attachment bracket 30c of the third exemplary embodiment in that instead of the hole 35e, the lower end face of the bracket body 35a serves as a retained portion 35g.

When the attachment bracket 30e is attached to the inner side of the side frame portions 11, 12, the retained portion 35g of the attachment bracket 30e is received/by a retaining member 15g provided on the inner side of the side frame portions 11, 12. In the state where the retained portion 35g is received by the retaining member 15g, the attachment bracket 30e is positioned and retained with respect to the through holes 15d of the side frame portions 11, 12. Thus, the attachment bracket 30e functions similarly to the attachment bracket 30c of the third exemplary embodiment.

Figure 9:
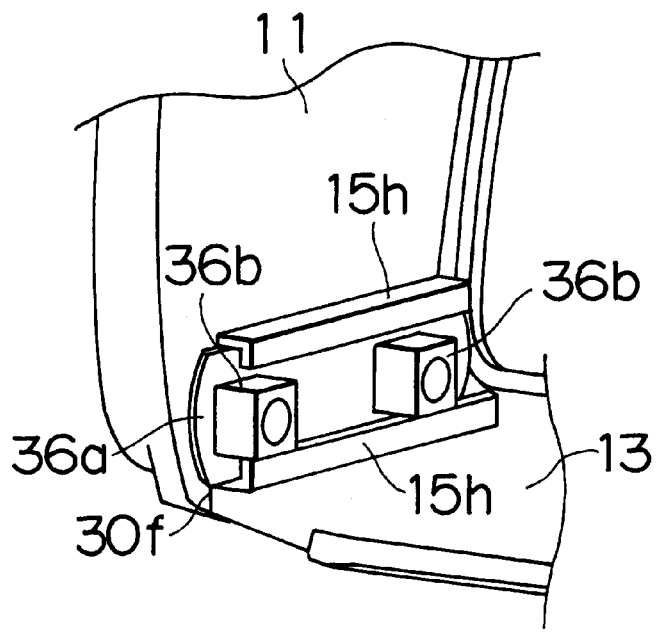
FIG. 9 is a perspective view of a sixth exemplary embodiment of an attachment bracket according to the invention.

FIG. 9 shows a sixth exemplary embodiment of the invention. An attachment bracket 30f of this embodiment is composed of a bracket body 36a and a pair of right and left nuts 36b fixed to the front surface of the bracket body 36a. Unlike the bracket bodies of the attachment brackets 30a to 30e of the first to the fifth exemplary embodiments, the bracket body 36a is an oblong rectangular shape having no hooked portion or retained portion. A pair of upper and lower rails 15h are provided on the inner side of the side frame portions 11, 12, such that the bracket body 36a is inserted into the space between the rails 15h. Accordingly, the attachment bracket 30f is positioned and retained with respect to the through holes 15d of the side frame portions 11, 12 by sliding the bracket body 36a between the rails 15h.

Figure 10:
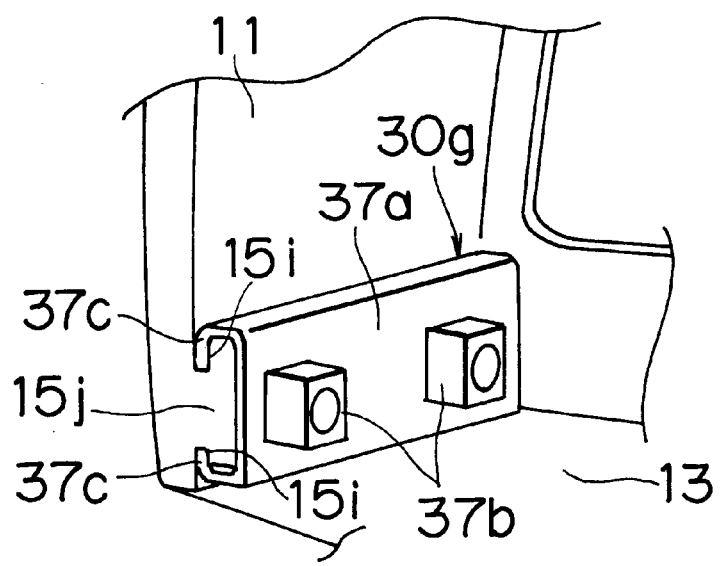
FIG. 10 is a perspective view of a seventh exemplary embodiment of an attachment bracket according to the invention.

FIG. 10 shows a seventh exemplary embodiment of the invention. An attachment bracket 30g of this embodiment is composed of a bracket body 37a and a pair of right and left nuts 37b fixed to the front surface of the bracket body 37a. Unlike the bracket body 36a of the attachment bracket 30f, the bracket body 37a is provided with flange portions 37c at its upper and lower edges. Each of the flange portions 37c has an L shape in cross section. A projecting wall 15j having a pair of upper and lower rail grooves 15i is formed on the inner side of the side frame portions 11, 12, such that the bracket body 37a slides over the projecting wall 15j from the lateral direction. Thus, the attachment bracket 30g is positioned and retained with respect to the through holes 15d of the side frame portions 11, 12 by sliding the bracket body 37a along the rail grooves 15i.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An attachment structure of a functional member, comprising:
    a frame integrally molded from an alloy;
    a functional member supported on a first side of the frame;
    a first fastener member inserted through the functional member and the frame on which the functional member is disposed;
    an attachment bracket provided on a second side of the frame;
    a second fastener member, provided on the bracket, into which the first fastener member is received;
    a hook portion provided in the frame; and
    a hooked portion provided on the attachment bracket, wherein the bracket is supported on the second side of the frame by hooking the hooked portion at the hook portion.

2. The structure according to claim 1, further comprising:
    a bracket support provided in at least one of the frame and the attachment bracket.

3. The structure according to claim 2, wherein the frame is a seat back frame, and the functional member is a connecting member for connecting the seat back frame to a seat cushion frame.

4. The structure according to claim 3, wherein the connecting member includes a hinge arm and a ratchet seat that constitute a reclining function.

5. The structure according to claim 1, wherein the frame is a seat back frame, and the functional member is a connecting member for connecting the seat back frame to a seat cushion frame.

6. The structure according to claim 5, wherein the connecting member includes a hinge arm and a ratchet seat that constitute a reclining function.

7. The structure according to claim 1, wherein the frame is a seat back frame, and the functional member is a connecting member of connecting the seat back frame to a seat cushion frame.

8. The structure according to claim 7, wherein the connecting member includes a hinge arm and a ratchet seat that constitute a reclining function.

9. The structure according to claim 1, wherein the first fastener member is a bolt and the second fastener member is a nut.

10. The structure according to claim 1, wherein the alloy is at least one of a magnesium alloy and an aluminum alloy.

11. The structure according to claim 1, further comprising:
    at least one pawl on the attachment bracket inserted into at least one hole in the frame.

12. A The structure according to claim 1, further comprising:
    a least one spring on the attachment bracket that engages the frame.

13. The structure according to claim 1, further comprising:
    at least one hole in the hooked portion that engages at least one projection in the hook portion.

14. The structure according to claim 1, further comprising:
    at least one leg on the attachment bracket that engages at least one pawl on the frame.

15. The structure according to claim 1, further comprising:
    at least one retained portion on the attachment bracket that is received by at least one retaining member on the frame.

16. The structure according to claim 15, wherein the retaining member includes at east one rail.

17. The structure according to claim 15, wherein the retained portion includes at least one flange portion and the, retaining member includes at least one groove.

18. The structure according to claim 1, wherein the functional member is a reclining functional member.

19. An attachment method of a functional member comprising:
    providing an attachment bracket on a first side of a frame integrally molded from an alloy;
    providing an attachment bracket on a second side of a frame integrally molded from an alloy;
    providing the functional member on a second side of the frame;
    providing the functional member on a first side of the frame;
    attaching the functional member to the frame by a first fastener member;
    providing a second fastener member on the attachment bracket, into which the first fastener member is received;

providing a hook portion in the frame;

providing a hooked portion on the attachment bracket; and supporting the bracket on the second side of the frame by hooking the hooked portion at the hook portion.

20. The method according to claim 19, wherein the functional member is reclining functional member.

21. The method according to claim 19, wherein the first fastener member is a bolt and the second fastener member is a nut.

22. An attachment structure of a functional member, comprising:

a seat back frame integrally molded from an alloy;

a functional member supported on a first side of the seat back frame;

a first fastener member inserted through the functional member and the seat back frame on which the functional member is disposed;

an attachment bracket provided on a second side of the seat back frame;

a second fastener member, provided on the bracket, into which the first fastener member is received;

a hook portion provided in the seat back frame; and a hooked portion provided on the attachment bracket, wherein the bracket is supported on the second side of the seat back frame by hooking the hooked portion at the hook portion.

* * * * *